(12) United States Patent
Knobel

(10) Patent No.: US 8,701,105 B2
(45) Date of Patent: Apr. 15, 2014

(54) DOWNLOADABLE STANDALONE OFFLINE APPLICATION WITH INTEGRATED DATA FOR DISTRIBUTED OFFLINE PROCESSING

(75) Inventor: Stefan Knobel, Nussloch (DE)

(73) Assignee: SAP AG, Walldorf (DE)

( * ) Notice: Subject to any disclaimer, the term of this patent is extended or adjusted under 35 U.S.C. 154(b) by 293 days.

(21) Appl. No.: 13/111,441

(22) Filed: May 19, 2011

(65) Prior Publication Data
US 2012/0297030 A1    Nov. 22, 2012

(51) Int. Cl.
*G06F 9/445* (2006.01)
(52) U.S. Cl.
USPC ............................ 717/173; 717/170; 717/178
(58) Field of Classification Search
USPC .................................................. 717/100–122
See application file for complete search history.

(56) References Cited

U.S. PATENT DOCUMENTS

2004/0031052 A1 * 2/2004 Wannamaker et al. ......... 725/61

FOREIGN PATENT DOCUMENTS

WO    WO-2008107269 A1    9/2008

OTHER PUBLICATIONS

"European Application Serial No. 12003947.4, Search Report mailed Jan. 4, 2013", 11 pgs.
Katz, Damien, "CouchDb, PHP and the offline Web", [Online]. Retrieved from the Internet: <URL: http://damienkatz.net/2006/10/couchdb_and_php.html>, (Oct. 8, 2006), 4 pgs.

* cited by examiner

*Primary Examiner* — Chuck Kendall
(74) *Attorney, Agent, or Firm* — Schwegman, Lundberg & Woessner, P.A.

(57) ABSTRACT

In a system and a method, a request from a client device to generate a downloadable file representing an offline version of a web-based application hosted by a web server is received. Application components and data used by the web-based application are packaged into the downloadable file, and the downloadable file is transmitted to the requesting client device. The web-based application is locked to prevent access to the web-based application. A revised downloadable file is received that includes changes to at least one of the application components and the data contained in the downloadable file. As applicable, the application components and data used by the web-based application are updated with the changes to the at least one of the application components and the data contained in the revised downloadable file. Subsequent to the updating, the web-based application is unlocked, and the downloadable file is invalidated.

25 Claims, 6 Drawing Sheets

DOWNLOADABLE STANDALONE OFFLINE APPLICATION WITH INTEGRATED DATA FOR DISTRIBUTED OFFLINE PROCESSING

TECHNICAL FIELD

This application relates generally to web applications, and specifically, to a system and method for a downloadable and standalone offline version of a web application.

BACKGROUND OF THE INVENTION

Business applications enable businesses the ability to increase their productivity. Traditionally, business applications have been standalone, native software applications that are installed on computer systems, provide various application functionality, and operate on business data using business logic. A recent trend in business application development has been the migration of business applications from standalone applications to web-based applications.

BRIEF DESCRIPTION OF THE DRAWINGS

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Various embodiments include at least one of a system, a method, and a non-transitory machine-readable medium with executable instructions stored thereon providing for generating an offline version of a web-based application.

In the example embodiments disclosed herein, a request from a client device to generate a downloadable file representing an offline version of a web-based application hosted by a web server may be received. Application components and data used by the web-based application may be packaged by a processor into the downloadable file. The downloadable file may be transmitted to the requesting client device. The web-based application may be locked to prevent access to the web-based application. A revised downloadable file may be received, with the revised downloadable file including changes to at least one of the application components and the data contained in the revised downloadable file. At least one of the application components and the data used by the web-based application may be updated with the changes to the at least one of the application components and the data contained in the revised downloadable file. In response to the updating, the web-based application may be unlocked, and in response to the unlocking, the downloadable file may be invalidated.

Figure 1:
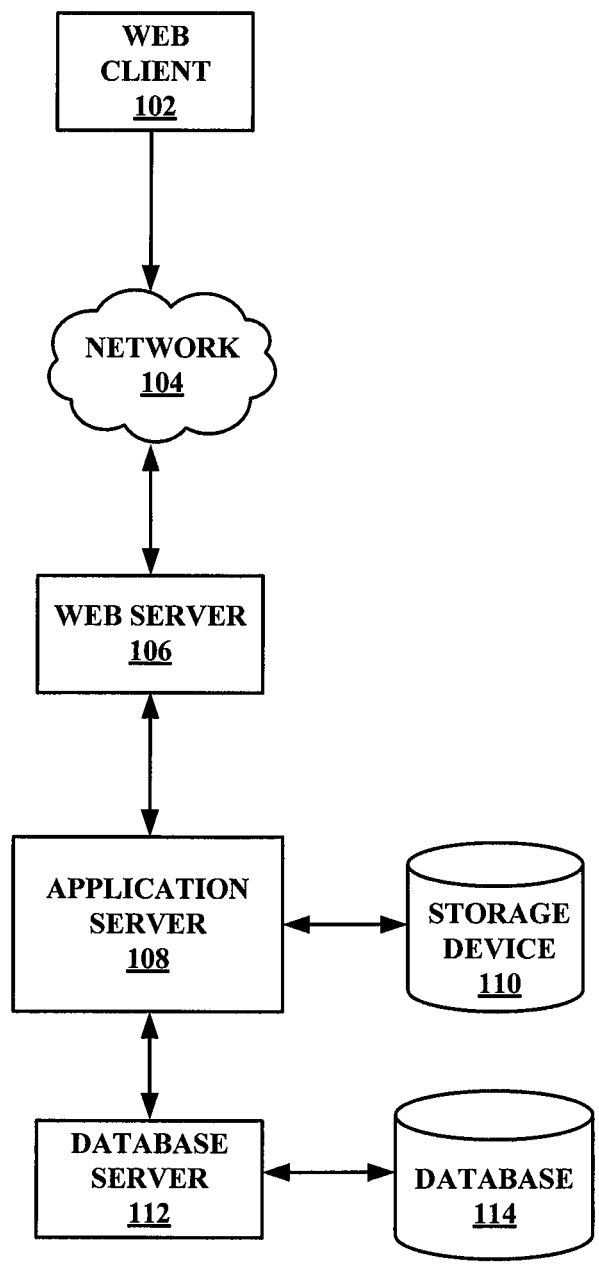
FIG. 1 is a block diagram illustrating an example embodiment of a networked environment within which a client device connects, via a network, with a central management server.

FIG. 1 is a block diagram illustrating an example embodiment of a networked environment within which a computing device may connect, via a network, with one or more systems storing application components. Referring to FIG. 1, a computer system, such as web client 102, may connect via a network 104 to a web server 106 hosting one or more web services and web-based applications. The web server 106 may be communicatively connected to an application server 108 executing, hosting, or providing application components, logic components, such as business logic, and data, such as business and application data. The application server 108 may be communicatively connected to a storage device 110, which may store the application components, logic components, and data provided by the application server 108. The application server 108 also may be communicatively connected to a database server 112. The database server 112 may receive database commands from the application server 108 and may retrieve records and other data, such as business or application data, stored in a database 114. The computer system, such as the web client 102, may execute a standalone application, such as an application suite, a business application, or a test application, that is installed on the computer system. In example embodiments, the computer system also may access a web-based version of such application via a web browser.

The foregoing listed applications are merely examples, and the types of application that may be executed in the networked environment of FIG. 1 are not limited to the foregoing applications. The computer systems capable of operating in the networked environment 100 need not be limited to a web client 102. Other computer systems may be desktop clients, mobile clients, terminal clients, and so forth, that either access the network-based system via web server 106 or access the application server 108 without connecting via the web server 106. Further, the network architecture depicted in FIG. 1 is merely exemplary; other network configurations and architectures may be used. The devices depicted in the example embodiments of FIG. 1 may be combined into a smaller number of devices or may each comprise one or more devices.

Figure 2:
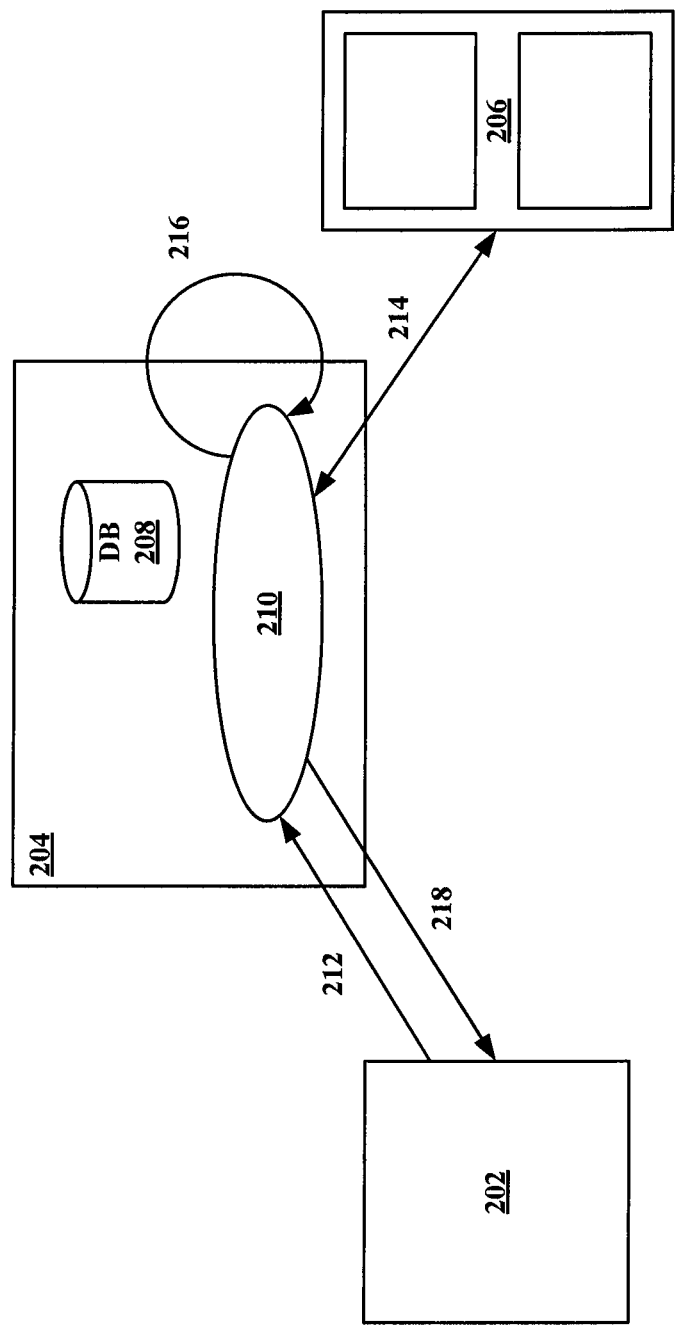
FIG. 2 is a diagram of an example embodiment of a system for generating a downloadable and standalone offline version of a web-based application.

FIG. 2 is a diagram of an example embodiment of a system for generating a downloadable and standalone offline version of a web-based application. Referring to FIG. 2, a computer system 202, such as the web client 102 of FIG. 1, may interact with a server system 204, such as the web server 106 and the application server 108 of FIG. 1, to access web services 210 provided by the server system 204. The web services may include one or more web-based applications, such as a web-based business application. The server system 204 may store and provide the functionality of the application(s) for use by the computer system 202 via a web-based interface. The computer system 202 may access the web-based application via, for example, a browser application, to access and manipulate data maintained by the server system 204. In an example embodiment, the data may include data stored in database 208. The data may be stored as records in the database 208. The data may comprise application or business data. In other example embodiments, the data may be stored in other data structures or in other data formats, such as name-value pairs.

In certain scenarios, the computer system 202 may not have access to the web-based application offered by the server system 204. For example, if the computer system 202 is operating or will operate in an offline state (e.g., disconnected from a network), the computer system 202 may not be able to access the web-based application. In these instances, the computer system 202 may transmit a request 212 to the server system 204 to generate a downloadable file representing an offline standalone version of the web-based application for downloading to the computer system 202. In an example embodiment, the request 212 may include a selection of application components or functionality to be included in the offline version of the web-based application. The request 212 also may include the data to be edited or used by the offline version of the web-based application. In other example embodiments, the request 212 may specify that all data applicable to the application be included in the offline version of the web-based application. In the event the request 212 does not specify the application components and/or data to be included in the offline version of the web-based application, the server system 204 may retrieve a default package of application components and data for the offline version of the web-based application. For example, the server system 204 may retrieve all application components and data related to the web-based application.

In response to the request, the server system 204 may dynamically retrieve the various application components or modules that comprise the web-based application desired for offline use. The retrieved application components may be packaged together 214 to form a downloadable file 206 that represents an offline and standalone version of the web-based application. Additionally, the server system 204 may retrieve data from the database 208 to include with the application components in the downloadable file 206.

In an example embodiment, the web-based application may be a Java® application. The server system 204 may retrieve and package application components and data to be edited or manipulated in a Java archive (e.g., .jar file, a Web Application Archive or .war file, a Resource Adapter Archive or .rar file, an Enterprise Archive or .ear file) or zip (e.g., .zip file) file. In the event additional application components and/or data are needed, the server system 204 may add, remove, or replace the application components or data contained in the zip file. In another example embodiment, the application components and data may be compiled to create an executable file. In the event different data and/or application components are selected subsequent to the compiling of the executable file or need to be changed, the server system 204 may perform a binary replacement of data or re-compile the executable file using the revised combination of application components and data.

The server system 204 may transmit 218 the application file 206 to the computer system 202. The computer system 202 may execute a Java Virtual Machine or other Java processor to unpack the archive file and execute the Java application contained therein. If the downloadable application file 206 is transmitted to the computer system 204 as an executable file, the computer system 202 may execute the executable file to launch the application.

In an example embodiment, upon transmission or downloading of the application file to the computer system 202, the server system 204 may record the downloading of the application file in the database 208. In one embodiment, the server system 204 may set a bit, flag, or other indicator in a record, file, or other data structure related to the specific application file to indicate that the application file has been downloaded. In another embodiment, the server system 204 may note the downloading of the application file in a record associated with the application file that is stored in the database 208. For example, the server system 204 may record that the application file has been downloaded, or the server system 204 may record additional details such as a timestamp of the download and/or an identity of the user (e.g., a user name, an IP address) who downloaded the application file. In the application file itself, a bit, indicator, or flag corresponding to the bit, indicator, or flag maintained by the server system 204 may be set as well to indicate that the application file has been downloaded. The corresponding indicators maintained in the server system 204 and in the application file may indicate whether the application file is downloaded and may indicate whether the version of the application file is the most current version.

When the application file is downloaded, the downloaded application file is considered the active version of the web-based application. In response to the download, all or part of the online web-based application may be locked 216 to preserve data consistency and maintain version control. In one embodiment, portions of the online web-based application are locked 216 corresponding to the data being edited or operated on in the downloaded offline version of the web-based application, thereby enabling other portions of the web-based application that are not included in the downloaded application file to be accessible to users. In another embodiment, the entire web-based application may be locked 216. The portions of the online web-based application to be locked 216 may be determined by the server system 204 by identifying and/or tracking the data included in the downloadable application file.

Figure 3:
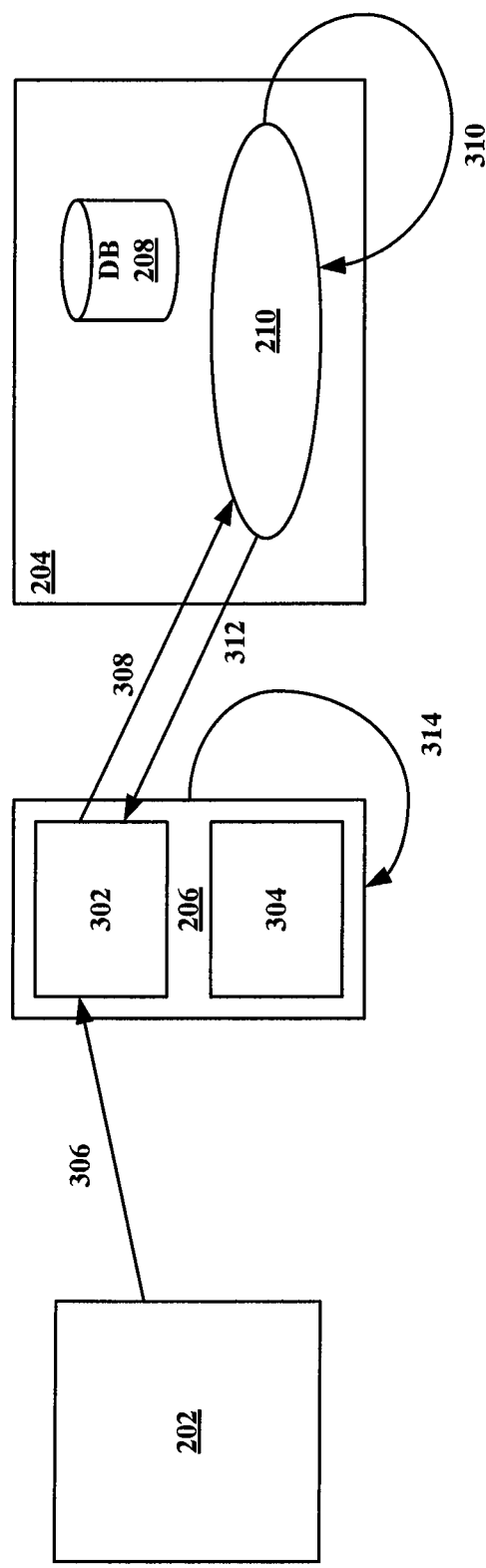
FIG. 3 is a diagram of an example embodiment of a system for uploading data entered via a downloadable and standalone offline version of a web-based application.

FIG. 3 is a diagram of an example embodiment of a system for uploading data entered via a downloadable and standalone offline version of a web-based application. Referring to FIG. 3, a computer system 202 may execute the offline version of the web-based application 206 and edit 306 data via the offline application 206. The offline application may comprise application components 302 providing application functionality to a user and data 304, such as business data, that may be operated on by the application components 302. When the computer system 202 is finished editing 306 data in the offline application 206, the computer system 202 may upload 308 the downloaded file representing the offline application 206 to a server system 204.

The server system 204 receives the uploaded offline application file and performs verification and processing of the offline application file. In one embodiment, verification may entail comparing the status bit, flag, or indicator stored in the offline application file with the status bit, flag, or indicator stored in the record, file, or other data structure maintained by the server system 204, for example, in the database 208. In one embodiment, the status bit, flag, or indicator may have a value. The value may correspond to a version of the offline application file. The server system 204 may compare the status bits, and if the status bits match each other, the server system 204 may conclude that the offline application file is current and is the most recent version of the application file downloaded. The updated data contained in the offline application file may be used to update the data maintained in the server system 204. Once the data maintained by the server system 204 is updated, the server system 204 may unlock 310 the online web-based application. The server system 204 may return 312 a status message to the user indicating that the downloaded application file has been successfully merged with the online web-based application.

In another example embodiment, mismatching status bits may indicate that either the online web-based application or the downloaded offline version of the web-based application is outdated or invalid. The server system 204 may examine a history of access to the web-based application to determine the last action taken. For example, the server system 204 may determine that the last action taken was a packaging and downloading of the online web-based application into a downloadable and standalone offline version. In this example, the server system 204 may determine that online web-based application is outdated or invalid. If the server system 204 determines the last action was the uploading of the standalone offline version of the web-based application, the server system 204 may determine that a subsequent attempt to upload the offline web-based application should be invalidated. As a result, the server system 204 may discard the uploaded offline application file. If a single status bit or set of bits is used to determine whether an online web-based application is current or whether an offline downloaded version of the web-based application is current, the single status bit or set of bits may be reset upon occurrence of an upload to indicate that the online web-based application is the current version.

If the offline application file has been successfully merged with the online web-based application, the offline application file may be locked 314 to prevent future use. In one embodiment, the offline application file may include a mechanism that locks or disables the offline application file from being used again after a successful merge with the server system 204. In another embodiment, the server system 204 may transmit a command to the offline application file to disable or lock the offline application file. For example, the server system 204 may transmit the command with the status message sent to the user that indicates a successful merging of the offline application file and the online web-based application. By locking the offline application file, version control of the application components and data used in the online web-based application may be maintained easily. If the user desires to edit the data operated on by the online web-based application, the user may request the downloading of another package of application components and data that comprise the current version of the online web-based application.

Figure 4:
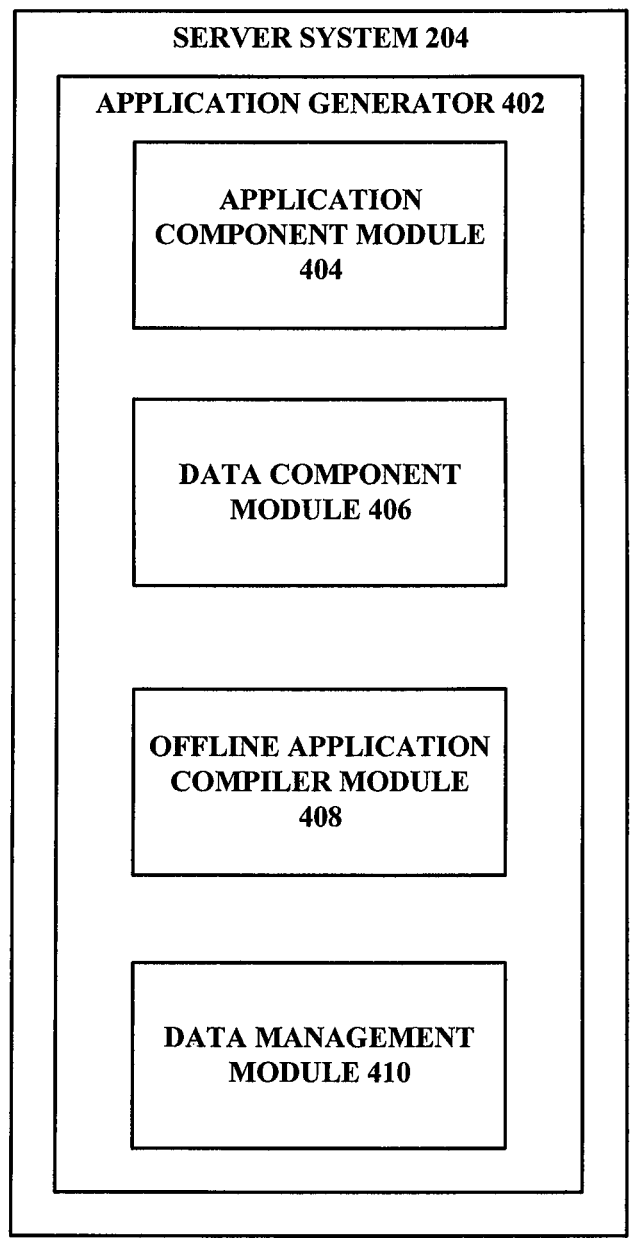
FIG. 4 is a block diagram of an application generator, in accordance with an example embodiment.

FIG. 4 is a block diagram of an application generator, in accordance with an example embodiment. An application generator 402 may reside in a server system, such as server system 204 described in the example embodiments of FIGS. 2 and 3. The application generator 402 may include an application component module 404, a data component module 406, an offline application compiler module 408, and a data management module 410. Each of the modules illustrated in FIG. 4 may be implemented or executed by one or more processors contained in the server system 204.

The application component module 404 may store application components used to implement the online web-based application. Each application component may provide the online web-based application with one or more functionalities or services. In other embodiments, each application component may encapsulate one or more sets of data used by the online web-based application. Each application component also may provide the online web-based application with a combination of application functionalities and sets of data for use therein. The application component module 404 may display or present application components (e.g., graphically, in a list) to the user to enable the user to select specific application components for inclusion in the downloadable offline version of the web-based application. In example embodiments, the application component module 404 also may package together commonly used application components to simplify the selection of application components. For example, the user may have the option to select a core set of application components for inclusion in the downloadable offline version of the web-based application rather than be forced to select each application component individually.

The data component module 406 may interface with and make available data for use in the online web-based application. In one embodiment, the data component module 406 may interface with various data storage devices, whether internal to the server system 204 (e.g., memory, internal hard drives, databases, other storage media) or external to the server system 204 (e.g., databases, data warehouses, remote storage devices) to retrieve data for use in the online web-based application. The data component module 406 also may provide a listing or display the data available for use with the online or offline versions of the web-based application. Based on the listing or display of data, a user may select the data to be included in the downloadable offline version of the web-based application.

The offline application compiler module 408 may receive the user selected application components and data from the application component module 404 and the data component module 406, respectively, and may generate a downloadable file representing an offline version of the web-based application. In example embodiments, the downloadable file may be a Java archive (e.g., .jar file, a Web Application Archive or .war file, a Resource Adapter Archive or .rar file, an Enterprise Archive or .ear file) or a zip (e.g., .zip file) file. Application components and data may be dynamically added and removed from the Java archive file or zip file as they are selected. by the user. The resulting Java archive or zip file may be transmitted to the user, where it may be unpacked to execute the offline version of the application. In other example embodiments, the downloadable file may be an executable file. The offline application compiler module 408 may compile the user-selected application components and data to generate the executable file. In the event the user dynamically changes the composition of the offline application, in one example embodiment, the offline application compiler module 408 may recompile and regenerate the executable file using the currently selected sets of application components and data. In another example embodiment, the offline application compiler module 408 may perform binary replacement of data, with the binary data corresponding to the de-selected application component or data being replaced by binary data corresponding to the newly selected application component or data.

The data management module 410 may manage the integrity of the data used in the web-based application. In one embodiment, the data management module 410 may track the active version of the web-based application using status bits, indicators, or other data structures. The status bits, indicators, or other data structures (e.g., records) may record the downloading or uploading of an offline version of the web-based application. The data management module 410 may correspondingly lock and unlock the online web-based application (or portions thereof) in response to the downloading and uploading of the offline version of the web-based application. Further, the data management module 410 may lock or invalidate the offline version of the web-based application, for example, after the offline version of the web-based application has been uploaded to the server system 204. The data management module 410 further may merge, update, or otherwise reconcile data that is uploaded from the downloadable offline version of the web-based application with data maintained in the server system 204.

Figure 5:
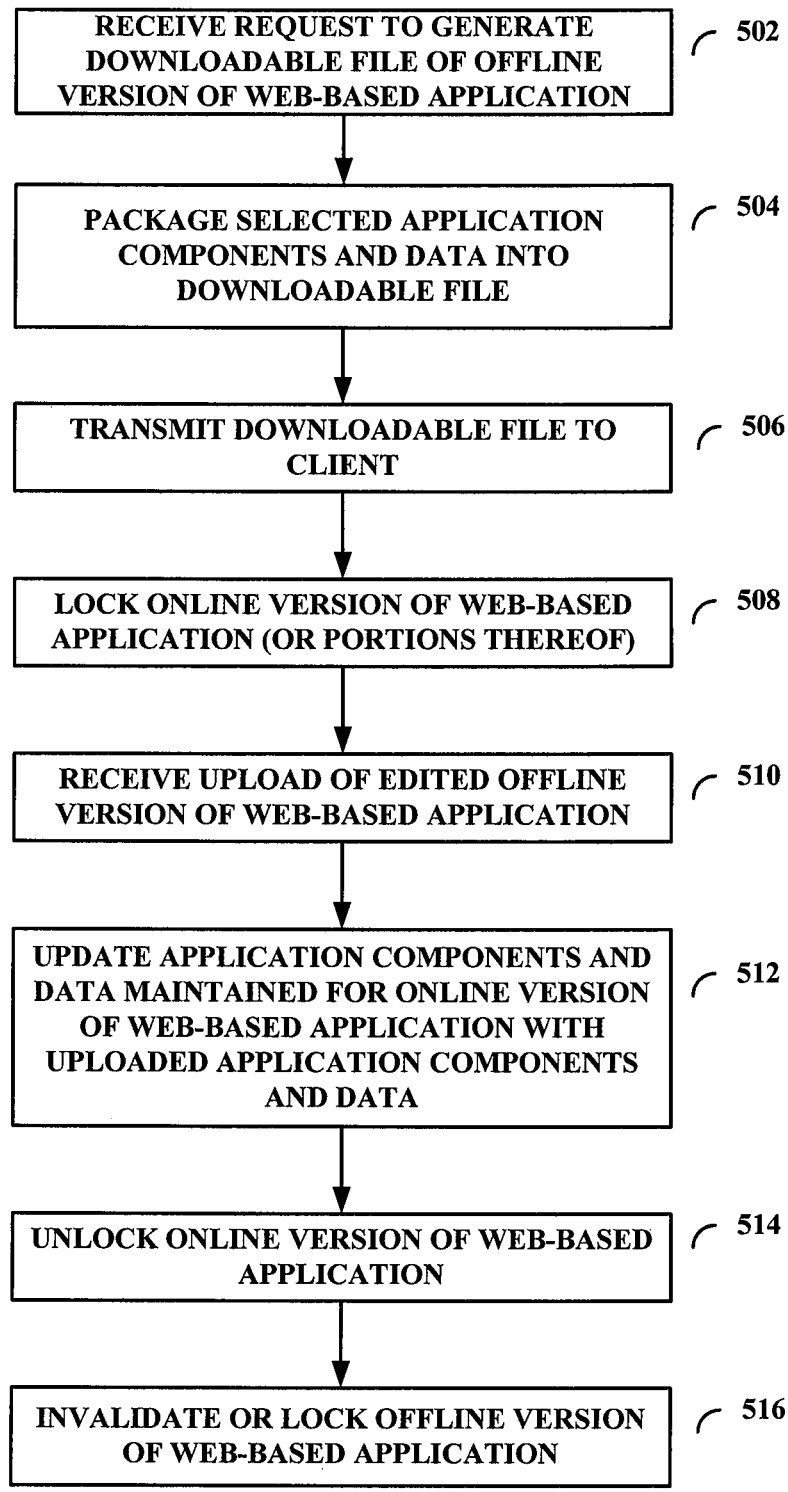
FIG. 5 illustrates an example method for generating and interfacing with a downloadable and standalone offline version of a web-based application.

FIG. 5 illustrates an example method for generating and interfacing with a downloadable and standalone offline version of a web-based application. Referring to FIG. 5, at operation 502, a server system, such as the server system 204 of FIG. 2, may receive a request to generate a downloadable file of an offline version of a web-based application. The downloadable file enables a user to execute an offline version of the web-based application in the event the user desires to work offline or for those situations where the user may not have network access to the web-based application, among other things. As part of the request, the server system may receive a selection or designation of certain application components and data to be included in the downloadable file. In one example embodiment, the downloadable file may be a replica of the online web-based application, in that it contains every application component and data accessible via the online web-based application. In other example embodiments, the downloadable file may include a subset of the application components and data accessible via the online web-based application. The server system 204 may present the application components and data available for selection to the user in one or more ways, such as in the form of graphic icons or in a list, among other things. In example embodiments, the data may be stored in devices, such as databases, hard drives, and memory, that are communicatively coupled to the server system 204.

At operation 504, the server system 204 may assemble the selected application components and data into a downloadable file. In an example embodiment, the online web-based application may be a Java-based application. The downloadable file may be a Java archive (e.g., .jar file, a .war file, a .rar file, an .ear file) or a zip (e.g., .zip file) file. In this example embodiment, the server system 204 may selectively add and remove components based on instructions from the user without a need to recompile the downloadable file. Structuring the web-based application as a downloadable file capable of being unpacked and executed may permit a user to execute the offline version of the web-based application without the need to install offline version of the web-based application on a client device.

At operation 506, the server system 204 transmits the downloadable file to the requesting client. At operation 508, subsequent to transmission of the downloadable file, the server system 204 may lock the online version of the web-based application. In one embodiment, upon transmission of the downloadable file, the server system 204 may lock the online version of the web-based application. In example embodiments, the server system 204 may selectively lock portions of the online version of the web-based application, with the portions locked corresponding to the data and/or functionality of the web-based application included in the transmitted downloadable file. Locking the online version of the web-based application may prevent users from accessing the web-based application (or locked portions thereof) via a browser and network connection, thereby preserving the integrity of the application functionality and data.

At operation 510, the server system 204 may receive an upload of the downloadable file from the client device. The upload may include edits, revisions, changes, and other modifications performed to the web-based application functionality and/or data. For example, a user may download the web-based application to further develop or revise application components while offline. In other example embodiments, a user may revise data using the downloaded web-based application. At operation 512, the server system 204 may update the application components and data stored in the server system 204 or related storage component, such as database 208. For example, if the upload includes revised or newly developed application components, the server system 204 may update the application components stored therein or in the database 208. Data stored by the server system 204 or the database 208 may be overwritten, updated, or saved as a new version as a result of changes to the data contained in the upload.

At operation 514, the online version of the web-based application may be unlocked. In an example embodiment, the online version of the web-based application may be unlocked after the updating of the revisions to the application components and/or data of the online version of the web-based application is completed. Unlocking the online version of the web-based application enables users to access the online version of the web-based application. At operation 516, the offline version of the web-based application, embodied in one example embodiment as a downloadable file, may be locked or otherwise invalidated. Locking or invalidating the offline version of the web-based application may prevent a user from accessing or executing the offline version of the web-based application. In effect, the system may implement a type of version control by locking and unlocking either the online or offline versions of the web-based application. The locking and unlocking of the different versions of the web-based application may prevent users from operating on stale application components or data.

Thus, systems, methods, and machine-readable media storing sets of instructions for generating a downloadable file representing an offline version of a web-based application, receiving revisions to the downloadable file, and updating application components and/or data related to the web-based application are disclosed. In one example, a computer-implemented method is provided. The method may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the request includes a designation of the application components and the data to be packaged in the downloadable file.

In one example, a computer-implemented method is provided. The method may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the downloadable file is a Java archive file, and the downloadable file is configured to be executed without installing the offline version of the web-based application on the client device.

In one example, a computer-implemented method is provided. The method may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the method may further include recording the transmitting of the downloadable file in a data record in response to the transmitting of the downloadable file. In one example, the recording the transmitting of the downloadable file in the data record includes at least one of setting a status bit to indicate the transmission of the downloadable file, recording an identity of a user receiving the downloadable file, recording an identifier of the client device receiving the downloadable file, and recording a timestamp of the transmission of the downloadable file. In one example, the method may further include recording an indicator in the downloadable file that indicates the downloadable file as being an active copy of the web-based application. In one example, the method may further include comparing the indicator in the downloadable file with the data record prior to the updating of the at least one application components and the data. Based on a match between the indicator and the data record, the method proceeds with the updating of the at least one application components and the data. Based on a mismatch between the indicator and the data record, the method prevents the updating of the at least one application components and the data from occurring. In one example, the method may further include comparing the indicator in the downloadable file with the data record prior to the updating of the at least one application components and the data. Based on a determination that the data record is empty, the downloadable file is invalidated and the at least one application components and the data is prevented from being updated.

In one example, a computer-implemented method is provided. The method may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the locking of the web-based application includes locking selective application components and data of the web-based application included in the downloadable file.

In one example, a non-transitory machine-readable medium is provided that stores instructions, which when executed by at least one processor, causes the at least one processor to perform operations. The operations may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the request includes a designation of the application components and the data to be packaged in the downloadable file.

In one example, a non-transitory machine-readable medium is provided that stores instructions, which when executed by at least one processor, causes the at least one processor to perform operations. The operations may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the downloadable file is a Java archive file, and wherein the downloadable file is configured to be executed without installing the offline version of the web-based application on the client device.

In one example, a non-transitory machine-readable medium is provided that stores instructions, which when executed by at least one processor, causes the at least one processor to perform operations. The operations may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the operations may further include recording the transmitting of the downloadable file in a data record in response to the transmitting of the downloadable file. In one example, the recording the transmitting of the downloadable file in the data record includes at least one of setting a status bit to indicate the transmission of the downloadable file, recording an identity of a user receiving the downloadable file, recording an identifier of the client device receiving the downloadable file, and recording a timestamp of the transmission of the downloadable file. In one example, the operations may further include recording an indicator in the downloadable file that indicates the downloadable file as being an active copy of the web-based application. In one example, the operations may further include comparing the indicator in the downloadable file with the data record prior to the updating of the at least one application components and the data. Based on a match between the indicator and the data record, the operations proceed with the updating of the at least one application components and the data. Based on a mismatch between the indicator and the data record, the operations prevent the updating of the at least one application components and the data from occurring. In one example, the operations may further include comparing the indicator in the downloadable file with the data record prior to the updating of the at least one application components and the data. Based on a determination that the data record is empty, the downloadable file is invalidated, and the updating of the at least one application components and the data is prevented from occurring.

In one example, a non-transitory machine-readable medium is provided that stores instructions, which when executed by at least one processor, causes the at least one processor to perform operations. The operations may include receiving a request from a client device to generate a downloadable file representing an offline version of a web-based application hosted by a web server. Application components and data used by the web-based application are packaged by a processor into the downloadable file. The downloadable file is transmitted to the requesting client device. The web-based application is locked to prevent access to the web-based application. A revised downloadable file is received, with the revised downloadable file including changes to at least one of the application components and the data contained in the revised downloadable file. At least one of the application components and the data used by the web-based application is updated with the changes to the at least one of the application components and the data contained in the revised downloadable file. In response to the updating, the web-based application is unlocked, and in response to the unlocking, the downloadable file is invalidated. In one example, the locking of the web-based application includes locking selective application components and data of the web-based application included in the downloadable file.

In one example, a system is provided and may include an offline application compiler module configured to generate a downloadable file corresponding to an offline version of a web-based application hosted by a web server. The downloadable file includes application components and data used by the web-based application. The system also may include a data management module configured to lock the web-based application to prevent access to the web-based application upon transmission of the downloadable file to a requesting client device. The data management module also may be configured to receive a revised downloadable file, with the revised downloadable file including changes to at least one of the application components and the data contained in the revised downloadable file. The data management module also may be configured to update at least one of the application components and the data used by the web-based application with the changes to the at least one of the application components and the data contained in the revised downloadable file. The data management module may be further configured to unlock the web-based application in response to the updating of the at least one of the application components and the data. The data management module may be further configured to invalidate the downloadable file in response to the unlocking of the web-based application. The offline application compiler module and the data management module are implemented by at least one processor. In one example, the system may further include an application component module configured to store the application components and provide a list of the application components to the client device for selective designation of the application components to be included in the downloadable file. The system may further include a data component module configured to interface with at least one data storage device to retrieve the data used by the web-based application.

In one example, a system is provided and may include an offline application compiler module configured to generate a downloadable file corresponding to an offline version of a web-based application hosted by a web server. The downloadable file includes application components and data used by the web-based application. The system also may include a data management module configured to lock the web-based application to prevent access to the web-based application upon transmission of the downloadable file to a requesting client device. The data management module also may be configured to receive a revised downloadable file, with the revised downloadable file including changes to at least one of the application components and the data contained in the revised downloadable file. The data management module also may be configured to update at least one of the application components and the data used by the web-based application with the changes to the at least one of the application components and the data contained in the revised downloadable file. The data management module may be further configured to unlock the web-based application in response to the updating of the at least one of the application components and the data. The data management module may be further configured to invalidate the downloadable file in response to the unlocking of the web-based application. The offline application compiler module and the data management module are implemented by at least one processor. In one example, the application components and the data included in the downloadable file are selectively designated by the requesting client device.

In one example, a system is provided and may include an offline application compiler module configured to generate a downloadable file corresponding to an offline version of a web-based application hosted by a web server. The downloadable file includes application components and data used by the web-based application. The system also may include a data management module configured to lock the web-based application to prevent access to the web-based application upon transmission of the downloadable file to a requesting client device. The data management module also may be configured to receive a revised downloadable file, with the revised downloadable file including changes to at least one of the application components and the data contained in the revised downloadable file. The data management module also may be configured to update at least one of the application components and the data used by the web-based application with the changes to the at least one of the application components and the data contained in the revised downloadable file. The data management module may be further configured to unlock the web-based application in response to the updating of the at least one of the application components and the data. The data management module may be further configured to invalidate the downloadable file in response to the unlocking of the web-based application. The offline application compiler module and the data management module are implemented by at least one processor. In one example, the downloadable file is a Java archive file, and the downloadable file is configured to be executed without installing the offline version of the web-based application on the client device.

In one example, a system is provided and may include an offline application compiler module configured to generate a downloadable file corresponding to an offline version of a web-based application hosted by a web server. The downloadable file includes application components and data used by the web-based application. The system also may include a data management module configured to lock the web-based application to prevent access to the web-based application upon transmission of the downloadable file to a requesting client device. The data management module also may be configured to receive a revised downloadable file, with the revised downloadable file including changes to at least one of the application components and the data contained in the revised downloadable file. The data management module also may be configured to update at least one of the application components and the data used by the web-based application with the changes to the at least one of the application components and the data contained in the revised downloadable file. The data management module may be further configured to unlock the web-based application in response to the updating of the at least one of the application components and the data. The data management module may be further configured to invalidate the downloadable file in response to the unlocking of the web-based application. The offline application compiler module and the data management module are implemented by at least one processor. In one example, the data management module may be further configured to record the transmitting of the downloadable file in a data record in response to the transmission of the downloadable file. In one example, the data management module may be configured to record the transmitting of the downloadable file in the data record by performing at least one of setting a status bit to indicate the transmission of the downloadable file, recording an identity of a user receiving the downloadable file, recording an identifier of the client device receiving the downloadable file, and recording a timestamp of the transmission of the downloadable file. In one example, the data management module may be further configured to record an indicator in the downloadable file that indicates the downloadable file as being an active copy of the web-based application. In one example, the data management module may be further configured to compare the indicator in the downloadable file with the data record prior to the data management module updating the at least one of the application components and the data. Based on a match between the indicator and the data record, the data management module updates the at least one application components and the data, and based on a mismatch between the indicator and the data record, the data management module does not update the at least one application components and the data. In one example, the data management module may be further configured to compare the indicator in the downloadable file with the data record prior to the data management module updating the at least one of the application components and the data. Based on a determination that the data record is empty, the data management module is further configured to invalidate the downloadable file and prevent the updating of the at least one application components and the data from occurring.

Modules, Components and Logic

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or module may also initiate communications with input or output devices, and can operate on a resource (e.g., a collection of information).

Example Machine Architecture and Machine-Readable Medium

Figure 6:
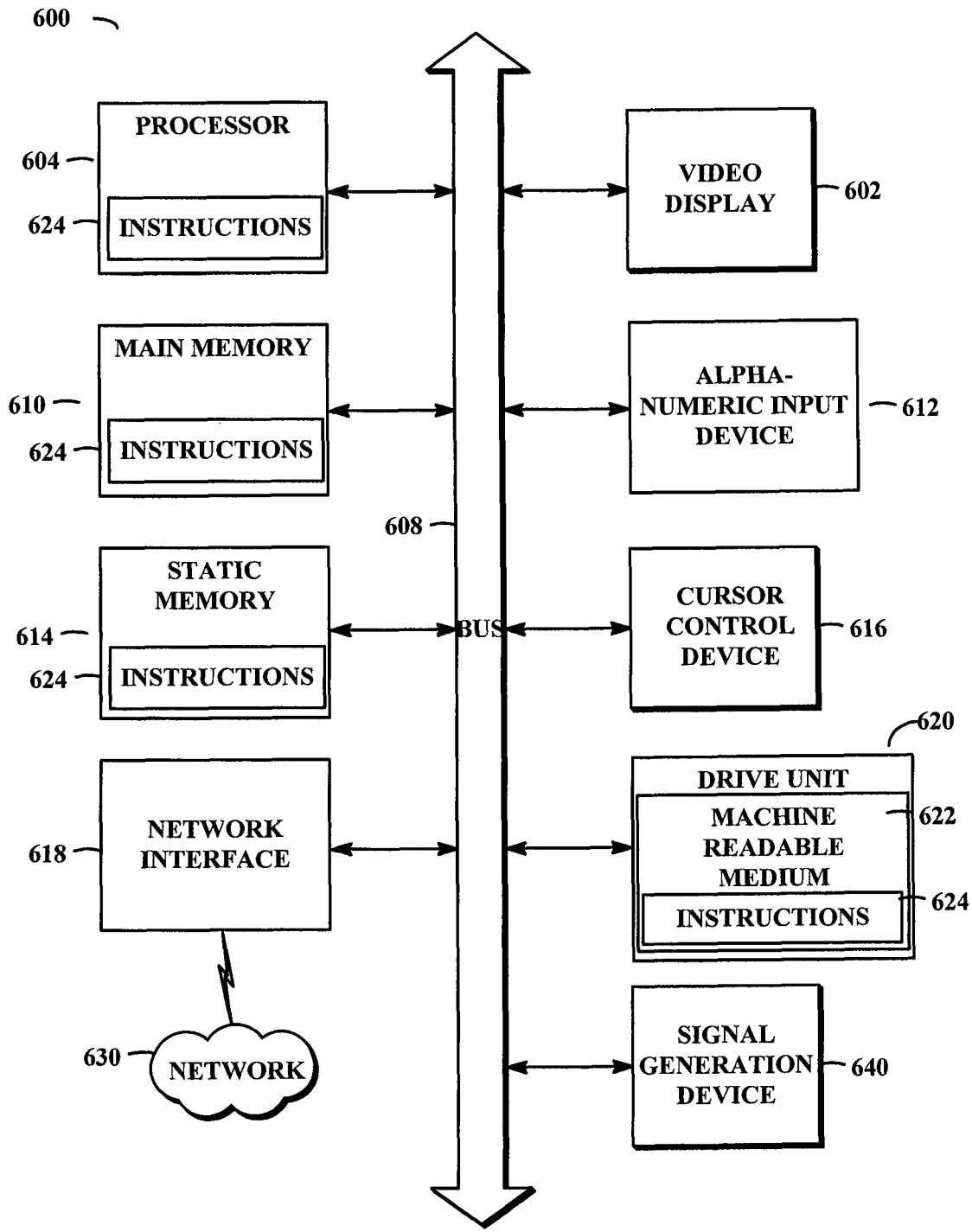
FIG. 6 illustrates a diagrammatic representation of machine in the example form of a computer system within which a set of instructions, for causing the machine to perform any one or more of the methodologies discussed herein, may be executed.

FIG. 6 illustrates a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client device or machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes at least one processor 604 (e.g., a central processing unit (CPU), a graphics processing unit (GPU) or both), a main memory 610 and a static memory 614, which communicate with each other via a bus 608. The computer system 600 may further include a video display unit 602 (e.g., a liquid crystal display (LCD) or a cathode ray tube (CRT)). The computer system 600 also includes an alphanumeric input device 612 (e.g., a keyboard), a user interface (UI) navigation device 616 (e.g., a mouse), a disk drive unit 620, a signal generation device 640 (e.g., a speaker) and a network interface device 618.

The disk drive unit 620 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 610 and/or within the processor 604 during execution thereof by the computer system 600, the main memory 610 and the processor 604 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible or non-transitory medium that is capable of storing, encoding or carrying instructions for execution by the machine and that cause the machine to perform any one or more of the methodologies of the disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 624 may further be transmitted or received over a communications network 630 using a transmission medium. The software 624 may be transmitted using the network interface device 618 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above-described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above-described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above-described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computer-implemented method, comprising;
receiving a request from a client device to generate a downloadable file representing an offline version of a web-based application, an online version of the web-based application is hosted by a web server;
packaging, by a processor, application components and data available for use by the offline version of the web-based application into the downloadable file, the downloadable file including all or selective application components and data available for use by the online version of the web-based application;
transmitting the downloadable file to the requesting client device;
locking the online version of the web-based application to prevent access to the application components and data available for use by the online version of the web-based application that were included in the downloadable file;
receiving a revised downloadable file, the revised downloadable file including changes to the downloadable file made by using the offline version of the web-based application; wherein at least one of the application components and data has been changed in the downloadable file;
updating at least one of the application components and data available for use by the online version of the web-based application with the revised downloadable file;
responsive to the updating, unlocking the online version of the web-based application; and
responsive to the unlocking, invalidating the downloadable file.

2. The computer-implemented method of claim 1, wherein the request includes a designation of the application components and the data to be packaged in the downloadable file.

3. The computer-implemented method of claim 1, wherein the downloadable file is a Java archive file, and wherein the downloadable file is configured to be executed without installing the offline version of the web-based application on the client device.

4. The computer-implemented method of claim 1, further comprising responsive to the transmitting of the downloadable file, recording the transmitting of the downloadable file in a data record.

5. The computer-implemented method of claim 4, wherein the recording the transmitting of the downloadable file in the data record comprises at least one of setting a status bit to indicate the transmission of the downloadable file, recording an identity of a user receiving the downloadable file, recording an identifier of the client device receiving the downloadable file, and recording a timestamp of the transmission of the downloadable file.

6. The computer-implemented method of claim 4, further comprising recording an indicator in the downloadable file that indicates the downloadable file as being an active copy of the web-based application.

7. The computer-implemented method of claim 6, further comprising prior to the updating of the at least one application components and the data, comparing the indicator in the downloadable file with the data record, wherein based on a match between the indicator and the data record, proceeding with the updating of the at least one application components and the data, and wherein based on a mismatch between the indicator and the data record, preventing the updating of the at least one application components and the data from occurring.

8. The computer-implemented method of claim 6, further comprising prior to the updating of the at least one application components and the data, comparing the indicator in the downloadable file with the data record, wherein based on a determination that the data record is empty, invalidating the downloadale file and preventing the updating of the at least one application components and the data from occurrig.

9. A non-transitory machine-readable medium storing a set of instructions that, when executed by at least one processor, causes the at least one processor to perform operations comprising:
receiving a request from a client device to generate a downloadable file representing an offline version of a web-based application, an online version of the web-based application is hosted by a web server;
packaging, by a processor, application components and data available for use by the online version of the web based application into the downloadable file, the downloadable file including all or selective application components and data available for use by the online version of the web-based application;
transmitting the downloadable file to the requesting client device;
locking the online version of the web-based application to prevent access to the application components and data available for use by the online version of the web-based application that were included in the downloadable file;
receiving a revised downloadable file, the revised downloadable file including changes to the downloadable file made by using the offline version of the web-based application; wherein at least one of the application components and data has been changed in the downloadable file;
updating, at least one of the application components and data available for use by the online version of the web-based application with the revised downloadable file;
responsive to the updating, unlocking the online version of the web-based application; and
responsive to the unlocking, invalidating downloadable file.

10. The non-transitory machine-readable medium of claim 9, wherein the request includes a designation of the application components and the data to be packaged in the downloadable file.

11. The non-transitory machine-readable medium of claim 9, wherein the downioadable file is a Java archive file, and wherein the downloadable file is configured to be executed without installing the offline version of the web-based application on the client device.

12. The non-transitory machine-readable medium of claim 9, further comprising responsive to the transmitting of the downloadable file, recording the transmitting of the downloadable file in a data record.

13. The non-transitory machine-readable medium of claim 12, wherein the recording the transmitting of the downloadable file in the data record comprises at least one of setting a status bit to indicate the transmission of the downloadable file, recording an identity of a user receiving the downloadable file, recording an identifier of the client device receiving the downloadable file, and recording a timestamp of the transmission of the downloadable file.

14. The non-transitory machine-readable medium of claim 12, further comprising recording an indicator in the downloadable file that indicates the downloadable file as being an active copy of the web-based application.

15. The non-transitory machine-readable medium of claim 14, further comprising prior to the updating of the at least one application components and the data, comparing the indicator in the downloadable file with the data record, wherein based on a match between the indicator and the data record, proceeding with the updating of the at least one application components and the data, and wherein based on a mismatch between the indicator and the data record, preventing the updating of the at least one application components and the data from occurring.

16. The non-transitory machine-readable medium of claim 14, further comprising prior to the updating of the at least one application components and the data comparing the indicator in the downloadable file with the data record, wherein based on a determination that the data record is empty, invalidating the downloadable file and preventing the updating of the at least one application components and the data from occurring.

17. A system, comprising:
an offline application compiler module configured to generate a downloadable file corresponding to an offline version of a web-based application, an online version of the web-based application is hosted by a web server, the downloadable file including application components and data available for use by the offline verion of the web-based application, the downloadable file including all or selective application components and, data available for use by the online version of the web-based application; and
a data management module configured to:
lock the online version of thee web-based application to prevent access to the application components and data available for use by the online version of the web-based application that were included in the downloadable file to a requesting client device;
receive a revised downloadable file, the revised downloadable file including changes to the downloadable file made by using the offline version of the we-based application; wherein at least one of the application components and data has been changed in the downloadable file;
update at least one of the application components and data available for use by the online version of the web-based application with the revised downloadable file;
responsive to the updating of the at least one of the application components and the data, unlock the online version of the web-based application; and
responsive to the unlocking of the online version of the web-based application, invalidate the downloadable file,
the offline application compiler module and the data management module being implemented by at least one processor.

18. The system of claim 17, further comprising:
an application component module configured to store the application components and provide a list of the application components to the client device for selective designation of the application components to be included in the downloadable file; and
a data component module configured to interface with at least one data storage device to retrieve the data used by the web-based application.

19. the system of claim 17, wherein the application components and the data included in the downloadable file are selectively designated by the requesting client device.

20. The system of claim 17, wherein the downloadable file is a Java archive file, and wherein the downloadable file is configured to he executed without installing the offline version of the web-based application on the client device.

21. The system of claim 17, wherein the data management module is further configured to record the transmitting of the downloadable tile in a data record in response to the transmission of the downloadable file.

22. the system of claim 21, wherein the data management module is configured to record the transmitting of the downloadable file in the data record by performing at least one of setting a status bit to indicate the transmission of the downloadable file, recording an identity of a user receiving the downloadable file, recording an identifier of the client device receiving the downloadable file, and recording a timestamp of the transmission of the downloadable file.

23. The system of claim 21, wherein the data management module is further configured to record an indicator in the downloadable file that indicates the downloadable file as being an active copy of the web-based application.

24. The system of claim 23, wherein the data management module is further configured to compare the indicator in the downloadable file with the data record prior to the data management module updating the at least one of the application components and the data wherein based on a match between the indicator and the data record, the data management module updates the at least one application components and the data, and wherein based on a mismatch between the indicator and the data record, the data management module does not update the at least one application components and the data.

25. The system of claim 23, wherein the data management module is further configured to compare the indicator in the downloadable tile with the data record prior to the data management module updating the at least one of the application components and the data, wherein based on a determination that the data record is empty, the data management module is further configured to invalidate the downloadable file and prevent the updating of the at least one application components and the data from occurring.

* * * * *